United States Patent
Marko et al.

(10) Patent No.: US 6,510,317 B1
(45) Date of Patent: Jan. 21, 2003

(54) SATELLITE DIGITAL AUDIO RADIO SERVICE TUNER ARCHITECTURE FOR RECEPTION OF SATELLITE AND TERRESTRIAL SIGNALS

(75) Inventors: Paul D. Marko, Pembrone Pines, FL (US); Anh X. Nguyen, Boynton Beach, FL (US)

(73) Assignee: XM Satellite Radio, Inc., Washington, DC (US)

( * ) Notice: Subject to any disclaimer, the term of this patent is extended or adjusted under 35 U.S.C. 154(b) by 0 days.

(21) Appl. No.: 09/435,317

(22) Filed: Nov. 4, 1999

(51) Int. Cl.[7] .................................................. H04B 1/26
(52) U.S. Cl. ...................... 455/428; 455/3.02; 455/3.06; 455/552; 455/277.1
(58) Field of Search ................................. 455/502, 503, 455/11.1, 12.1, 13.1, 313, 314, 315, 323, 302, 304, 306, 428, 552, 553, 277.1, 277.2, 3.02, 3.06; 375/347

(56) References Cited

U.S. PATENT DOCUMENTS

| | | | | |
|---|---|---|---|---|
| 5,856,763 A | * | 1/1999 | Reeser et al. | 331/117 R |
| 5,924,021 A | * | 7/1999 | Paul et al. | 455/209 |
| 6,177,863 B1 | * | 1/2001 | Oliver, Jr. | 340/328 |
| 6,259,902 B1 | * | 7/2001 | Siomkos et al. | 455/180.1 |
| 6,295,440 B2 | * | 9/2001 | Chang et al. | 455/13.1 |
| 6,301,313 B1 | * | 10/2001 | Gevargiz et al. | 370/321 |
| 6,314,289 B1 | * | 11/2001 | Eberlein et al. | 375/225 |
| 6,317,583 B1 | * | 11/2001 | Wolcott et al. | 370/318 |
| 6,337,980 B1 | * | 1/2002 | Chang et al. | 455/13.1 |
| 6,373,883 B1 | * | 4/2002 | Soerensen et al. | 329/316 |

* cited by examiner

Primary Examiner—Edward F. Urban
Assistant Examiner—Khawar Iqbal
(74) Attorney, Agent, or Firm—William J. Benman, Esq.

(57) ABSTRACT

A satellite digital audio radio receiver system and method. The inventive receiver includes a circuit for down-converting a first ensemble in a received combined signal in a first mode of operation and for down-converting a second ensemble from the received combined signal in a second mode of operation. The first ensemble includes a first signal received from a first transmitter, a second signal received from a second transmitter, and a third signal received from a third transmitter. The second ensemble includes a second signal from the first transmitter, a second signal from the second transmitter, and a second signal from the third transmitter. A controller is included to selectively switch the circuit from the first mode to the second mode. The first ensemble comprises first, second and third frequency slots and the second ensemble comprises fourth, fifth, and sixth frequency slots. In the illustrative embodiment, the first and second transmitters are mounted on first and second satellites and the third transmitter is a terrestrial repeater. Both ensembles are transmitted in accordance with the XM frequency plan. The first ensemble is down-converted using low side injection and the second ensemble down-converted using high side injection. The inventive circuit includes a synthesized frequency source. The circuit further includes a first intermediate frequency down-conversion stage with a first mixer for mixing the received combined signals with the output of synthesized frequency source. The circuit further includes first and second surface acoustic wave filters for separating the first and second signals received from the third signals. The inventive circuit further includes a second intermediate frequency down-conversion stage having second and third mixers for mixing the outputs of the first and second filters, respectively, with the output of a local oscillator.

24 Claims, 6 Drawing Sheets

SATELLITE DIGITAL AUDIO RADIO SERVICE TUNER ARCHITECTURE FOR RECEPTION OF SATELLITE AND TERRESTRIAL SIGNALS

BACKGROUND OF THE INVENTION

1. Field of the Invention

The present invention relates to communications systems. More specifically, the present invention relates to satellite digital audio service (SDARS) tuner architectures.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

Satellite radio operators will soon provide digital quality radio broadcast services covering the entire continental United States. These services intend to offer approximately 100 channels, of which nearly 50 channels will provide music with the remaining stations offering news, sports, talk and data channels. According to C. E. Unterberg, Towbin, satellite radio has the capability to revolutionize the radio industry, in the same manner that cable and satellite television revolutionized the television industry.

Satellite radio has the ability to improve terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHz) of the electromagnetic spectrum for satellite digital broadcasting, 12.5 MHz of which are owned by CD Radio and 12.5 MHz of which are owned by the assignee of the present application "XM Satellite Radio Inc.". The FCC further mandated the development of interoperable receivers for satellite radio reception, i.e. receivers capable of processing signals from either CD Radio or XM Radio broadcasts. The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters will broadcast the same program content in order to improve coverage reliability. Some mobile receivers will be capable of simultaneously receiving signals from two satellites and one terrestrial repeater for combined spatial, frequency and time diversity, which provides significant mitigation against multipath and blockage of the satellite signals. In accordance with XM Radio's unique scheme, the 12.5 MHz band will be split into 6 slots. Four slots will be used for satellite transmission. The remaining two slots will be used for terrestrial re-enforcement.

In accordance with the XM frequency plan, each of two geostationary Hughes 702 satellites will transmit identical or at least similar program content. The signals transmitted with QPSK modulation from each satellite (hereinafter satellite 1 and satellite 2) will be time interleaved to lower the short-term time correlation and to maximize the robustness of the signal. For reliable reception, the LOS signals transmitted from satellite 1 are received, reformatted to Multi-Carrier Modulation (MCM) and rebroadcast by non line-of-sight (NLOS) terrestrial repeaters. The assigned 12.5 MHz bandwidth (hereinafter the "XM" band) is partitioned into two equal ensembles or program groups A and B. The use of two ensembles allows 4096 Mbits/s of total user data to be distributed across the available bandwidth. Each ensemble will be transmitted by each satellite on a separate radio frequency (RF) carrier. Each RF carrier supports up to 50 channels of music or data in Time Division Multiplex (TDM) format. With terrestrial repeaters transmitting an A and a B signal, six total slots are provided, each slot being centered at a different RF carrier frequency. The use of two ensembles also allows for the implementation of a novel frequency plan which affords improved isolation between the satellite signals and the terrestrial signal when the receiver is located near the terrestrial repeater.

In any event, there is a need for a receiver capable of receiving both ensembles transmitted by satellite and transmitted by terrestrial repeaters. The conventional solution would require two radio frequency (RF) tuner front ends, one for satellite signals and the other for terrestrial signals. Unfortunately, the use of dual RF tuners adds significantly to the cost of the receiver inasmuch as each would require an antenna, a mixer/down-converter, at least one low noise amplifier, filters and etc.

Accordingly, a need exists in the art for inexpensive satellite digital audio radio receiver architecture capable of receiving both ensembles transmitted by satellites and terrestrial repeaters.

SUMMARY OF THE INVENTION

The need in the art is addressed by the satellite digital audio radio receiver and method of the present invention. The inventive receiver includes a circuit for down converting a first ensemble in a received combined signal in a first mode of operation and for down-converting a second ensemble from the received combined signal in a second mode of operation. The first ensemble includes a first signal received from a first transmitter, a first signal received from a second transmitter, and a first signal received from a third transmitter. The second ensemble includes a second signal received from the first transmitter, a second signal received from the second transmitter, and a second signal received from the third transmitter. The first ensemble comprises first, second and third frequency slots and the second ensemble comprises fourth, fifth, and sixth frequency slots. A controller is included to selectively switch the circuit from the first mode to the second mode.

In the illustrative embodiment, the first and second transmitters are mounted on first and second satellites and the third transmitter is a terrestrial repeater. Both ensembles are transmitted in accordance with the XM frequency plan. The first ensemble is down-converted using low side injection and the second ensemble down-converted using high side injection.

The inventive circuit includes a switchable dual voltage controlled oscillator. The circuit further includes a first intermediate frequency down-conversion stage with a first mixer for mixing the received combined signals with the output of the voltage-controlled oscillator. The circuit further includes first and second filters for separating the first and second signals received from the third signals. In the illustrative embodiment, the first and second filters are surface acoustic wave filters.

The inventive circuit further includes a second intermediate frequency down-conversion stage having second and third mixers for mixing the outputs of the first and second filters, respectively, with the output of a local oscillator. In the illustrative embodiment, the frequencies are chosen so that the second mixer and the third mixer receive a reference input from a single local oscillator.

DESCRIPTION OF THE INVENTION

Illustrative embodiments and exemplary applications will now be described with reference to the accompanying drawings to disclose the advantageous teachings of the present invention.

Figure 1:
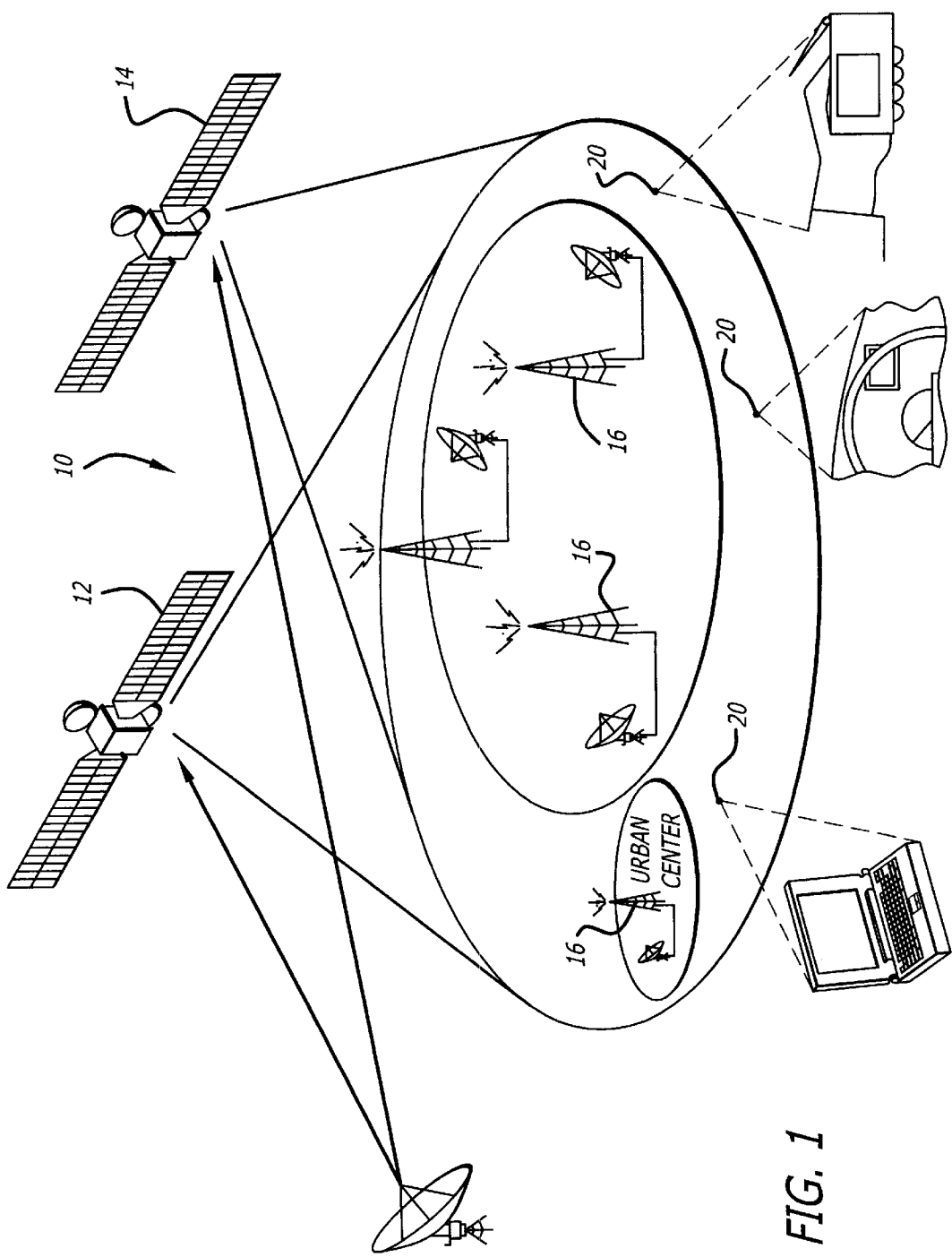
FIG. 1 is an illustrative implementation of a satellite digital audio service (SDARS) system architecture.

An illustrative implementation of satellite digital audio service (SDARS) system architecture is depicted in FIG. 1. The system 10 includes first and second geostationary satellites 12 and 14 which transmit line-of-sight (LOS) signals to SDARS receivers located on the surface of the earth. The satellites provide for interleaving and spatial diversity. (Those skilled in the art will appreciate that in the alternative, the signals from the two satellites could be delayed to provide time diversity.) The system 10 further includes plural terrestrial repeaters 16 which receive and retransmit the satellite signals to facilitate reliable reception in geographic areas where LOS reception from the satellites is obscured by tall buildings, hills, tunnels and other obstructions. The signals transmitted by the satellites 12 and 14 and the repeaters 16 are received by SDARS receivers 20. As depicted in FIG. 1, the receivers 20 may be located in automobiles, handheld or stationary units for home or office use. The SDARS receivers 20 are designed to receive one or both of the satellite signals and the signals from the terrestrial repeaters and combine or select one of the signals as the receiver output as discussed more fully below.

Figure 2:
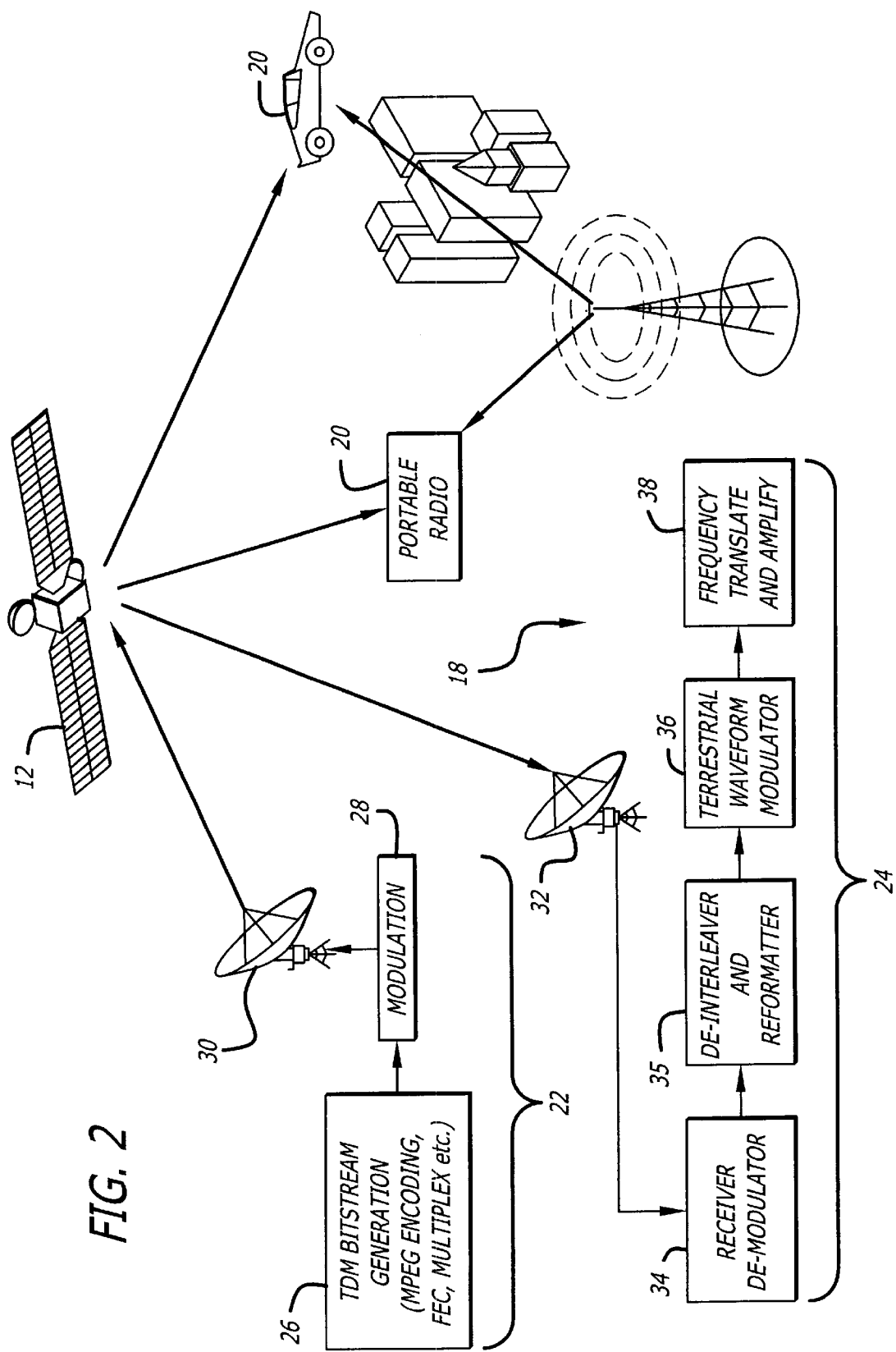
FIG. 2 is a diagram which illustrates the system of FIG. 1 in greater detail.

FIG. 2 is a diagram which illustrates the system 10 of FIG. 1 in greater detail with a single satellite and a single terrestrial repeater. FIG. 2 shows a broadcast segment 22 and a terrestrial repeater segment 24. In the preferred embodiment, an incoming bit stream is encoded into a time division multiplexed (TDM) signal using a coding scheme (such as MPEG) by an encoder 26 of conventional design. The TDM bit stream is upconverted to RF by a conventional quadrature phase-shift keyed (QPSK) modulator 28. The upconverted TDM bit stream is then uplinked to the satellites 12 and 14 by an antenna 30. Those skilled in the art will appreciate that the present invention is not limited to the broadcast segment shown. Other systems may be used to provide signals to the satellites without departing from the scope of the present teachings.

The satellites 12 and 14 act as bent pipes and retransmit the uplinked signal to terrestrial repeaters 18 and portable receivers 20. As illustrated in FIG. 2, the terrestrial repeater includes a receiver demodulator 34, a de-interleaver and reformatter 35, a terrestrial waveform modulator 36 and a frequency translator and amplifier 38. The receiver and demodulator 34 down-converts the downlinked signal to a TDM bitstream. The de-interleaver and reformatter 35 re-orders the TDM bitstream for the terrestrial waveform. The digital baseband signal is then applied to a terrestrial waveform modulator 36 (e.g. MCM or multiple carrier modulator) and then frequency translated to a carrier frequency prior to transmission.

As will be appreciated by those skilled in the art, the strength of the signal received close to the terrestrial repeaters will be higher than that received at a more distant location. A concern is that the terrestrial signal might interfere with the reception of the satellite signals by the receivers 30. For this reason, in the best mode, a novel frequency plan such as that described below is utilized.

Figure 3:
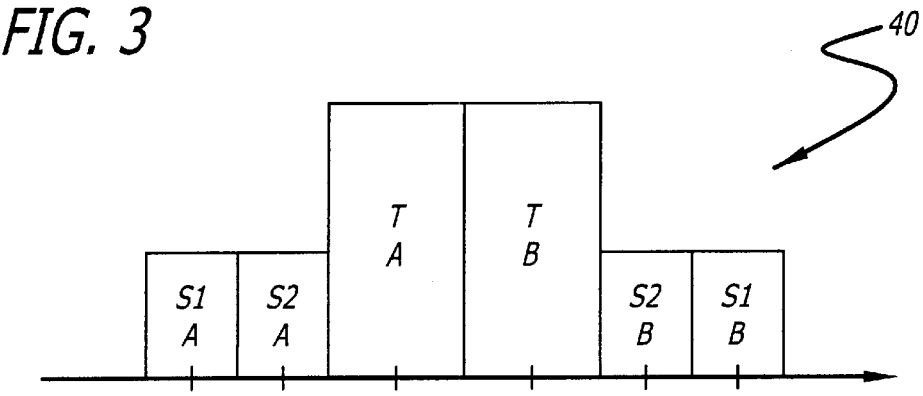
FIG. 3 is a diagram that depicts a frequency plan for a two-satellite SDARS broadcast system utilizing the XM band in accordance with the present teachings.

FIG. 3 is a diagram that depicts a frequency plan for a two-satellite SDARS broadcast system utilizing the XM band 40 in accordance with the present teachings. In FIG. 3, "S1" is the first satellite 12; "S2" is the second satellite 14; "T" is the terrestrial repeater 16; "A" is ensemble A; and "B" ensemble B. Each satellite transmits ensembles A and B. In the illustrative embodiment, the XM radio frequency band consisting of 12.5 MHz in S-band (2332.5 MHz to 2345 MHz) is split into six slots. The baseline frequency plan is depicted in FIG. 3. Each of two ensembles (A and B) includes 256 Prime Rate Channels, 8 Kbps wide, for the total of 512 Prime Rate Channels. Each ensemble consists of two satellite bands (S1 and S2) and one terrestrial band (terrestrial repeaters T). Accordingly, the frequency plan of satellite downlink and terrestrial repeaters is as follows:

| Satellite/Terrestrial | Ensemble | Center Frequency | Usable Signal Bandwidth |
|---|---|---|---|
| Satellite S1 | A | 2333.465 MHz | 1.886 MHz |
| Satellite S2 | A | 2335.305 MHz | 1.886 MHz |
| Terrestrial T | A | 2337.490 MHz | 2.48 MHz |
| Terrestrial T | B | 2340.020 MHz | 2.48 MHz |
| Satellite S2 | B | 2342.205 MHz | 1.886 MHz |
| Satellite S1 | B | 2344.045 MHz | 1.886 MHz |

The spacing of center frequencies between the S1 satellite and the S2 satellite is 1.84 MHz. The center frequency spacing between terrestrial ensemble A and terrestrial ensemble B is 2.53 MHz.

Those skilled in the art will appreciate that other frequency plans may be used without departing from the scope of the present teachings.

Figure 4:
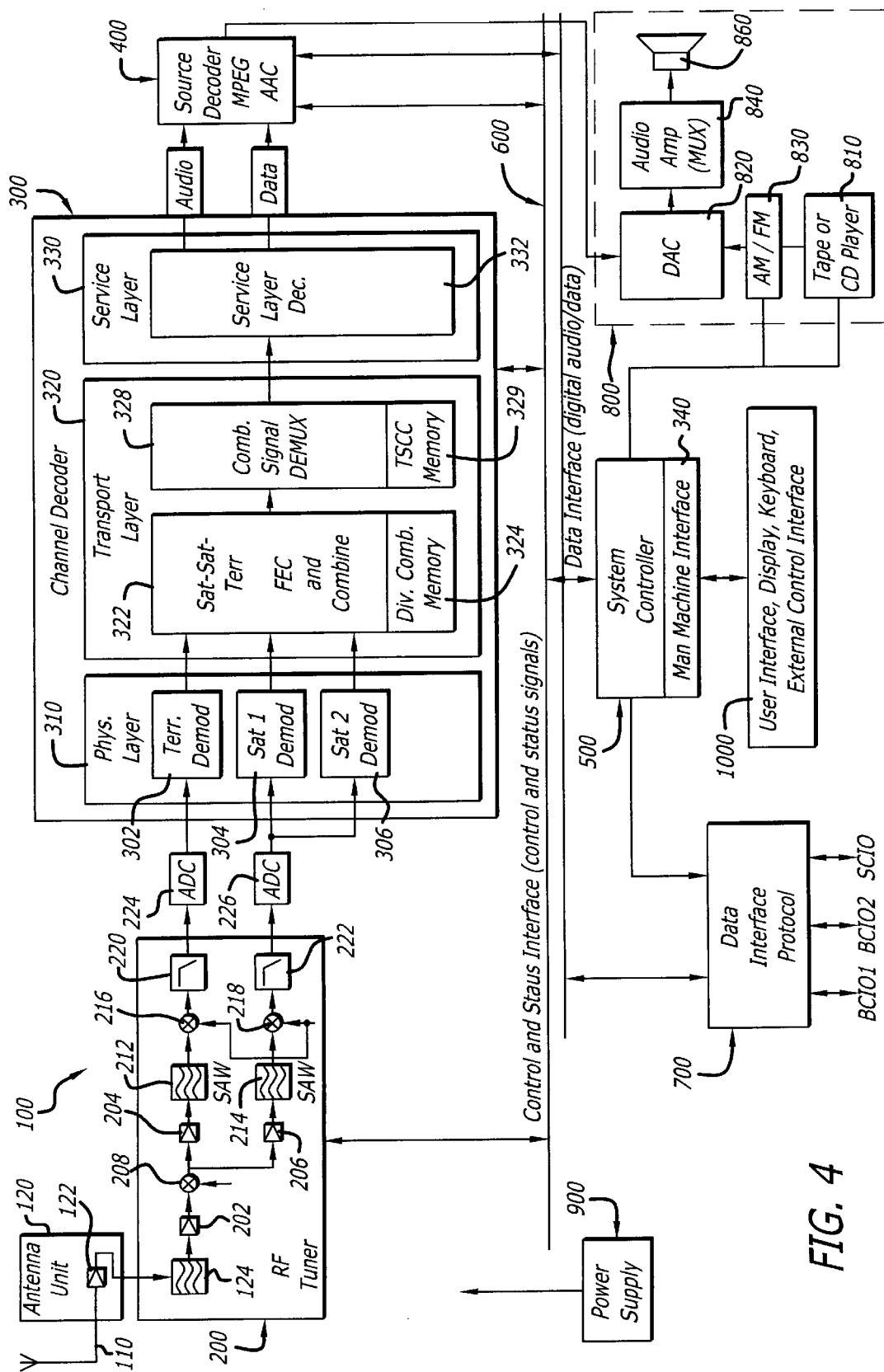
FIG. 4 is a block diagram of an illustrative implementation of an SDARS receiver constructed in accordance with the teachings of the present invention.

FIG. 4 is a block diagram of an illustrative implementation of an SDARS receiver 20 constructed in accordance with the teachings of the present invention. The receiver 20 includes an antenna module 100, an RF tuner module 200, a channel decoder 300, a source decoder 400, a digital control and status interface bus 600, system controller 500, data interface 700, audio output circuit 800, power supply 900, and a user interface 1000.

Figure 5:
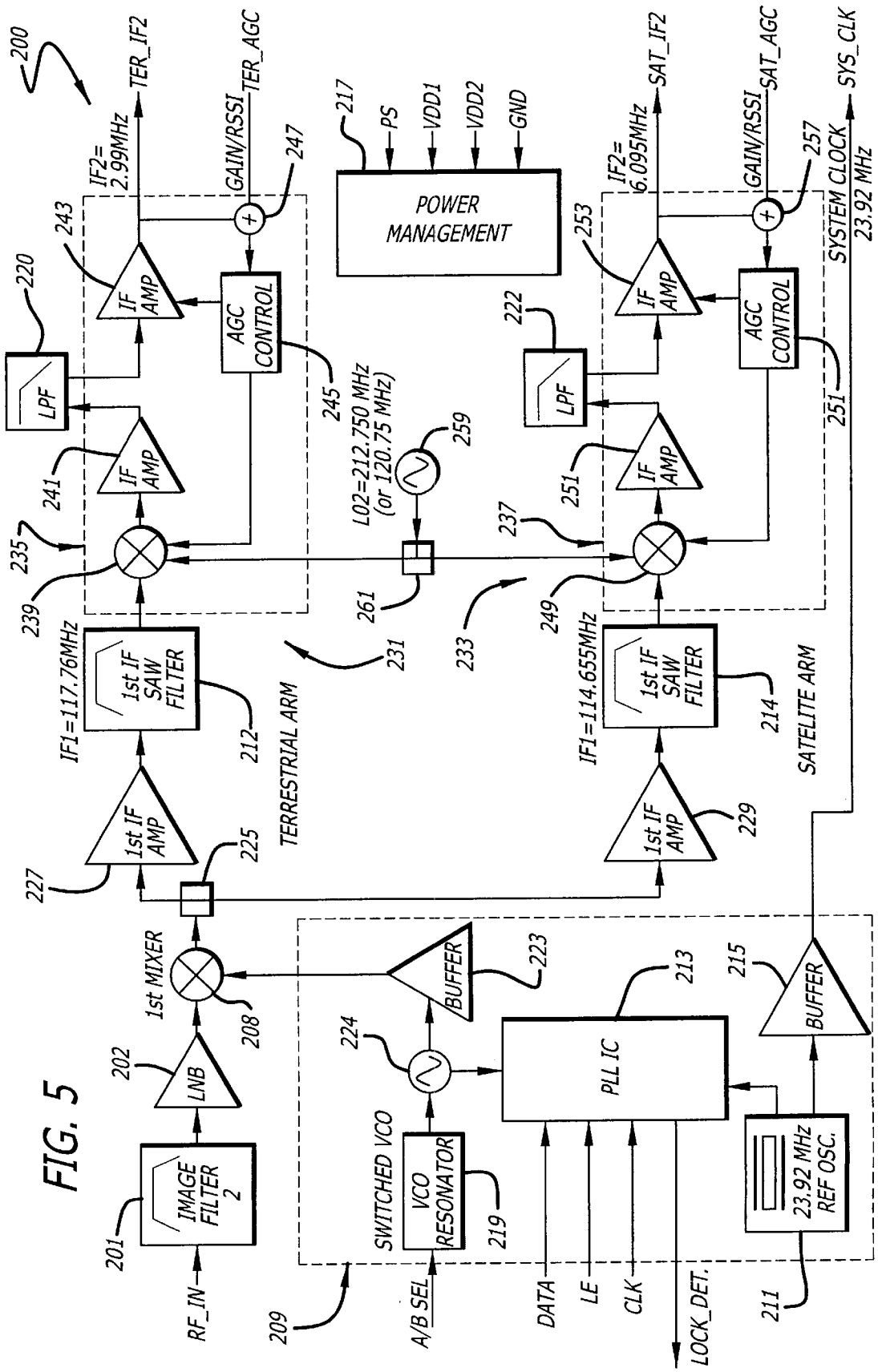
FIG. 5 is a detailed view of the antenna module and tuner module capable of receiving both satellite and terrestrial repeater signals for either ensemble in accordance with the teachings of the present invention.

FIG. 5 is a detailed view of the antenna module 100 and tuner module 200 capable of receiving both satellite and terrestrial repeater signals for either ensemble in accordance with the teachings of the present invention. The RF signal received by the antenna 110 of the antenna module 100 (FIG. 4) is received, in the tuner module 200, by a second image filter 201. The filtered RF signal is amplified by a low noise amplifier 202. The output of the low noise amplifier 202 is input to a first mixer 208. The first mixer is driven by a synthesized frequency source 209. The synthesized frequency source 209 effects a switching of the tuner 200 between the frequencies associated with the two ensembles as discussed more fully below. The synthesized frequency source 209 includes a reference oscillator 211 such as a crystal oscillator. The reference oscillator 211 feeds a phase locked loop integrated circuit 213 and a buffer 215. The output of the buffer amplifier provides a system clock signal. The phase locked loop 213 receives "DATA", "LE", and "CLK" inputs from the System Controller 500 and outputs a lock detect signal "LOCK_DET" to the System Controller.

The synthesized frequency source 209 further includes a voltage-controlled oscillator (VCO) 224 which operates with resonator 219. The resonator 219 switches between first and second resonant frequencies in response to an A/B select signal "A/B SEL". The A/B SEL signal together with the "DATA", "LE", and "CLK" signals are provided by the system controller 500 (FIG. 5) to control the frequency of the synthesized frequency source 209.

The VCO 224 feeds the phase locked loop 213 and a buffer 223. The output of the buffer 223 is the output of the synthesized frequency source 209 and provides a second input to the first mixer 208. Consequently, the received RF input signal is down-converted by first and second frequencies in response to the A/B select signal and the "DATA", "LE", and "CLK" signals.

A splitter 225 supplies the output of the first mixer 208 to first and second intermediate frequency (IF) amplifiers 227 and 229. The first IF amplifier 227 is disposed in a terrestrial repeater signal processing path 231 and the second IF amplifier 229 is disposed in a satellite signal processing path 233.

In each path 231 or 233, a surface acoustic wave (SAW) filter 212 or 214 is provided which filters the output of the associated first IF amplifier 227 or 229, respectively. The first SAW filter 212 isolates the signals from a selected ensemble received from a terrestrial repeater. The second SAW filter 214 isolates the signals from a selected ensemble received from both satellites.

The output of the each SAW filter 212 and 214 is input to a integrated circuit (IC) 235 and 237, respectively, which mixes the filtered signal down from a first intermediate frequency (IF1) to a second intermediate frequency (IF2). For example, for the terrestrial arm 231, IF1 may be 117.76 MHz and IF2 2.99 MHz. In the satellite arm 233, the SAW filter is adapted to isolate the signals from a selected ensemble received from both satellites. For the satellite arm 233, IF1 may be 114.655 MHz and IF2 6.095 MHz. Those skilled in the art will appreciate that the present invention is not limited to the frequencies illustrated in the present disclosure. For example, alternative frequencies are depicted in FIG. 5.

Each IC 235 and 237 includes a mixer 239 and 249, an IF amplifier 241 and 251, a low pass filter 220 and 222, a second IF amplifier 243 and 253, respectively. The output of the second IF amplifier 243 in the IC 235 in the terrestrial path 231 is added to a terrestrial automatic gain control signal TER_AGC by a summer 247 and fed back to the IC mixer 239 and the IF amplifier 243 through an automatic gain control circuit 245. Likewise, the output of the second IF amplifier 253 in the IC 237 in the satellite path 233 is added to a satellite automatic gain control signal by a summer 257 and fed back to the IC mixer 249 and the IF amplifier 253 by an automatic gain control circuit 251.

The external automatic gain control signals for the terrestrial repeater path and the satellite path are provided by the channel decoder 300 (not shown).

Returning to FIG. 5, the reference frequency for the mixer 239 in the terrestrial path and the mixer 249 in the satellite path is provided by a second signal source 259 via a second splitter 261.

The outputs of the backend ICs 235 and 237 are output to analog-to-digital (A/D) converters 224 and 226, respectively, (FIG. 4). The channel decoder 300 digitally separates and decodes the two satellite channels.

In operation, the RF tuner module 200 depicted in FIG. 5 first RF down-converts a half block of XM frequency spectrum (either ensemble A or B) to the same low IF frequency spectrum. After the first down-conversion, the satellite 1, satellite 2 and terrestrial spectrums are split and fed into two separate IF branches. In the illustrative embodiment, the satellite spectrum of 3.726 MHz is selectively filtered by the satellite IF SAW filter 214 and then down-converted to the second IF centered at 6.095 Hz. The terrestrial spectrum of 2.48 MHz is filtered by another terrestrial IF SAW filter 212 and down-converted to the second IF frequency centered at 2.99 MHz.

Figure 6:
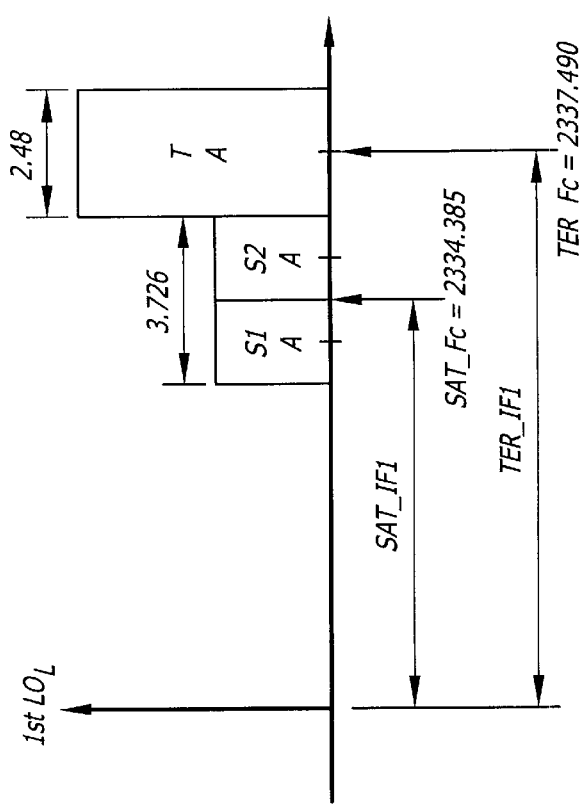
FIG. 6 is a diagram that illustrates a first downconversion with low side injection for ensemble A in accordance with the teachings of the present invention.

FIG. 6 is a diagram that illustrates a first downconversion with low side injection for ensemble A in accordance with the teachings of the present invention. Thus, in accordance with the present teachings, for the frequencies used in the illustrative embodiment, when ensemble A is selected by the system controller 500 via the A/B select input, the satellite and terrestrial frequency slots, shown in FIG. 7, as S1A, S2A, TA are down-converted in accordance with the following low side injection relation:

$$1stLO_L=(SAT\_Fc)-(SAT\_IF1)=(TER\_Fc)-(TER\_IF1) \quad [1]$$

where:

$1stLO_L$=the frequency output by the source 209 for low side injection;

SAT_Fc=the center frequency between the two satellites S1A and S2A;

SAT_IF1=the first intermediate frequency used for the satellite arm 233;

TER_Fc=the center frequency for the terrestrial repeater TA; and

TER_IF1=the first intermediate frequency used for the terrestrial arm 231.

Hence, in accordance with the present teachings, the frequency spectrum of S1A, S2A is down-converted to the first IF spectrum centered at SAT_IF1 (in the illustrative implementation 114.655 MHz). In the illustrative embodiment, the frequency spectrum of TA is down-converted to the first IF spectrum centered at TER_IF1 (in the illustrative implementation 117.76 MHz) by the same low side first LO injection. Note that data inversion will be required since, as discussed more fully below, in the illustrative embodiment, the present invention uses low side injection for first LO stage 208, 209 and high-side injection for second LO stage 239, 249, and 259.

Figure 7:
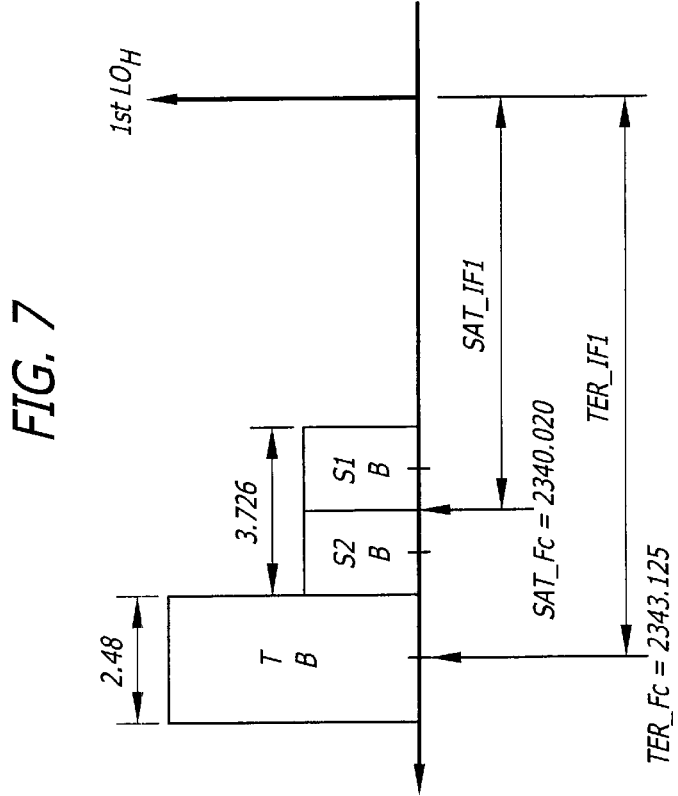
FIG. 7 is a diagram that illustrates a first downconversion with high side injection for ensemble B in accordance with the teachings of the present invention.

FIG. 7 is a diagram that illustrates a first downconversion with high side injection for ensemble B in accordance with the teachings of the present invention. In accordance with the present teachings, for the frequencies used in the illustrative embodiment, when ensemble B is selected, the satellite and terrestrial frequency slots, shown in FIG. 7, as S1B, S2B, TB are down-converted in accordance with the following high side injection relation:

$$1stLO_H = (SAT\_Fc) + (SAT\_IF1) = (TER\_Fc) + (TER\_IF1) \quad [2]$$

where:
- $1stLO_H$=the frequency output by the source 209 for high side injection;
- SAT_Fc=the center frequency between the two satellites S1B and S2B;
- SAT_IF1=the first intermediate frequency used for the satellite arm 233;
- TER_Fc=the center frequency for the terrestrial repeater TB; and
- TER_IF1=the first intermediate frequency used for the terrestrial arm 231.

In this case, the frequency spectrum of S1B, S2B is down-converted to the first IF spectrum centered at SAT_IF1 (in the illustrative implementation 114.655 MHz). In the illustrative embodiment, the frequency spectrum of TB is down-converted to the first IF spectrum centered at TER_IF1 (in the illustrative implementation 117.76 MHz) by the same high side first LO injection. Note that data inversion is not be needed here since now both the first LO stage 208, 209 and the second LO stage 239, 249, and 259 are high side injection stages.

Due to the fact that the first down-conversion stage 208, 209 requires either low side or high side injection dependent on ensemble A or B selected respectively, the synthesized frequency source 209 is required to switch either to low side injection or to high side injection by the logic state of A/B SEL along with the configuration signals from the system controller 500, discussed previously. In addition, the channel decoder 300 is required to support a configurable DATA INVERSION bit in order to invert data polarity due to high side or low side injection scheme of the first and second local oscillator (LO) stages 208, 209 and 239, 249 and 259, respectively.

Returning to FIG. 5, as mentioned above, the signal output by the first IF 208, 209 is split by splitter 225 and amplified by two separate IF amplifiers 227 and 229. Next, the signal is processed by two separate IF SAW filters 212 and 214 to isolate the terrestrial component from the satellite component. These first IF signals are selectively down-converted to two different second IF frequencies by a common high side second LO injection stage 239, 259 or 249, 259. In the illustrative embodiment, the second IF signals are centered at 2.99 MHz for the terrestrial receiver path 231 and 6.095 Mhz for the satellite receiver path 233. See FIG. 8 below.

Figure 8:
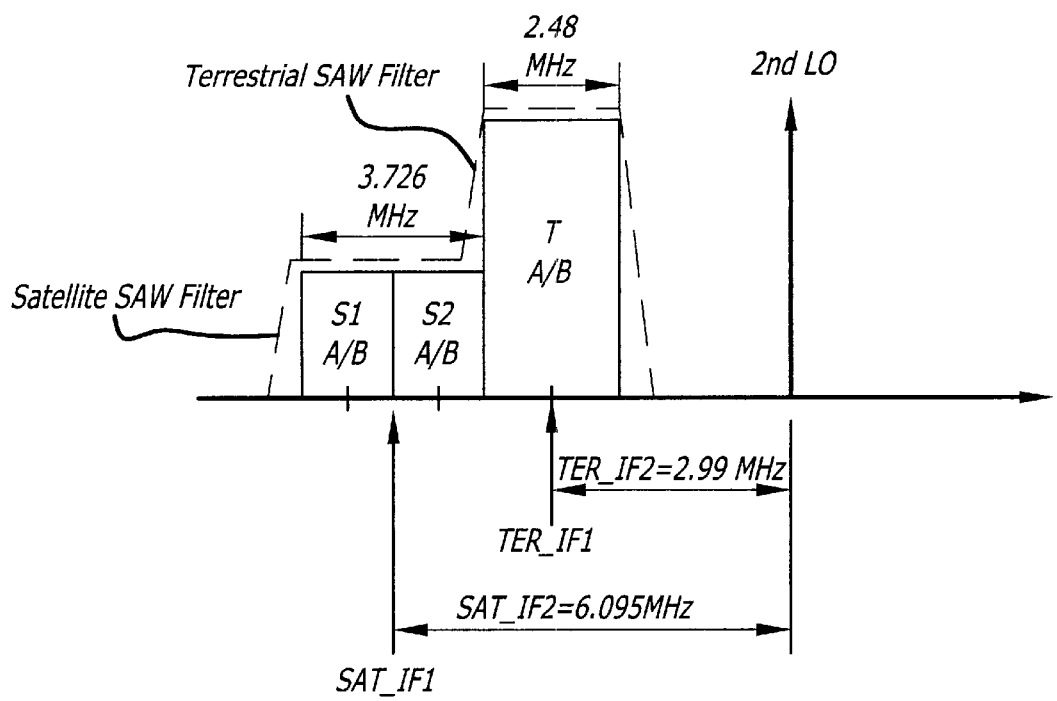
FIG. 8 is a diagram that illustrates the result of the second down-conversion stage for ensemble A and ensemble B.

FIG. 8 is a diagram that illustrates the result of the second down-conversion stage for ensemble A and ensemble B. In accordance with the present teachings, for the frequencies used in the illustrative embodiment, after the first downconversion stage, the satellite and terrestrial frequency slots for both ensembles are next down-converted in accordance with the following high side injection relation:

$$2nd\ LO = SAT\_IF1 + SAT\_IF2 = TER\_IF1 + TER\_IF2 \quad [3]$$

Returning to FIG. 5, the second IF signals from the second mixer 239 and 249 outputs are filtered by anti-aliasing low pass filters 220 and 222 before being amplified by the second IF amplifiers 243 and 253.

Automatic gain control (AGC) circuits 245 and 251 keep the output signals of the second IF at a constant level and to protect A/D converters from overloading under high signal strength conditions. The gains of second mixers 239 and 249 and the second IF amplifiers 243 and 253 are controlled by an external digital AGC voltage fed from the channel decoder IC 300.

Finally, the signals from the first satellite 12 (S1) are separated from the signals from the second satellite 14 (S2) by digital filter stages which are included within the satellite 1 demodulator stage and the satellite 2 demodulator stage (306) in the channel decoder 300.

Those skilled in the art will appreciate the parts and cost reduction realized by the present invention over a conventional tuner architecture, where two image filters, two first mixers and two first local oscillators would be required.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A receiver comprising:
   first means for down-converting a first ensemble in a received signal in a first mode of operation and for down-converting a second ensemble in said received signal in a second mode of operation, said first ensemble being transmitted with a first carrier and comprising a first signal received from a first transmitter, a first signal received from a second transmitter, and a first signal received from a third transmitter and said second ensemble being transmitted with a second carrier and comprising a second signal from said first transmitter, a second signal from said second transmitter, and a second signal from said third transmitter and
   second means for selectively switching said first means from said first mode to said second mode.

2. The invention of claim 1 wherein said first and second transmitters are mounted on first and second satellites respectively.

3. The invention of claim 2 wherein said third transmitter is a terrestrial repeater.

4. The invention of claim 1 wherein said first ensemble comprises first, second and third frequency slots.

5. The invention of claim 4 wherein said second ensemble comprises fourth, fifth, and sixth frequency slots.

6. The invention of claim 1 wherein said first means includes means for down-converting signals in said first ensemble using low side injection.

7. The invention of claim 6 wherein said second means includes means for down converting signals in said second ensemble using high side injection.

8. The invention of claim 7 wherein said ensembles are transmitted in accordance with the XM frequency plan.

9. The invention of claim 1 wherein said first means includes a switchable dual voltage controlled oscillator.

10. The invention of claim 9 wherein said first means further includes a first intermediate frequency down-conversion stage with a first mixer for mixing said received combined signals with the output of said voltage controlled oscillator.

11. The invention of claim 10 wherein said first means further includes first and second filters for separating said first and second signals received from said third signals.

12. The invention of claim 11 wherein said first and second filters are surface acoustic wave filters.

13. The invention of claim 11 wherein said first means further includes a second intermediate frequency down-conversion stage having second and third mixers for mixing the outputs of said first and second filters, respectively, with the output of a local oscillator.

14. The invention of claim 13 wherein said second mixer and said third mixer receive a reference input from a single local oscillator.

15. The invention of claim 1 wherein said second means is a system controller.

16. A receiver comprising:
a switchable dual voltage controlled oscillator circuit for down-converting a first ensemble in a received combined signal in a first mod e of operation and for down-converting a second ensemble in a second mode of operation, said first ensemble being transmitted with a first carrier and including first, second and third frequency slots having a first signal in said first slot received from a first satellite, a first signal in said second slot received from a second satellite, and a first signal in said third slot received from a terrestrial repeater and said second ensemble being transmitted with a second carrier and including fourth, fifth, and sixth frequency slots from having a second signal from said first satellite in said fourth slot, a second signal from said second satellite in said fifth slot, and a second signal from said terrestrial repeater in said sixth slot and
a controller for selectively switching said switchable dual voltage controlled oscillator circuit from said first mode to said second mode.

17. The invention of claim 16 wherein said voltage controlled oscillator includes a circuit for down-converting signals in said first ensemble using low side injection.

18. The invention of claim 17 wherein said voltage controlled oscillator includes a circuit for down-converting signals in said second ensemble using high side injection.

19. The invention of claim 18 wherein said ensembles are transmitted in accordance with the XM frequency plan.

20. A receiver comprising:
a switchable dual voltage controlled oscillator circuit for down-converting a first ensemble in a received combined signal the first mode operation and for down-converting a second ensemble in said received combined signal in a second mode of operation, said first ensemble being transmitted with a first carrier and comprising a first signal received from a first satellite, a first signal received from a second satellite, and a first signal received from a terrestrial repeater and said second ensemble being transmitted with a second carrier and comprising a second signal from said first satellite, a second signal from said second satellite, and a second signal from said terrestrial repeater, said switchable voltage controlled oscillator circuit including:
a first intermediate frequency down-conversion stage with a first mixer for mixing said received combined signals with the output of said voltage controlled oscillator,
first and second filters for separating said first and second signals received from said third signals, and
a second intermediate frequency down-conversion stage having second and third mixers for mixing the outputs of said first and second filters, respectively, with the output of a local oscillator and
a controller for selectively switching said switchable dual voltage controlled oscillator circuit from said first mode to said second mode.

21. The invention of claim 20 wherein said first and second filters are surface acoustic wave filters.

22. The invention of claim 20 wherein said second mixer and said third mixer receive a reference input from a single local oscillator.

23. A method for down-converting a received signal including the steps of:
down-converting a first ensemble in a received combined signal in a first mode of operation and for down-converting a second ensemble in said received combined signal in a second mode of operation, said first ensemble being transmitted with a first carrier and comprising a first signal received from a first transmitter, a first signal received from a second transmitter, and a first signal received from a third transmitter and said second ensemble being transmitted with a second carrier and comprising a second signal from said first transmitter, a second signal from said second transmitter, and a second signal from said third transmitter and
selectively switching from said first mode to said second mode.

24. A receiver comprising:
first means for down-converting a first ensemble in a received signal in a first mode of operation and for down-converting a second ensemble in said received signal in a second mode of operation, said first ensemble being transmitted with a first carrier and comprising a first signal received from a first transmitter, a first signal received from a second transmitter, and a first signal received from a third transmitter and said second ensemble being transmitted with a second carrier and comprising a second signal from said first transmitter, a second signal from said second transmitter, and a second signal from said third transmitter, said first means including:
a switchable dual voltage controlled oscillator,
a first intermediate frequency down-conversion stage with a first mixer for mixing said received combined signals with the output of said voltage controlled oscillator,
first and second filters for separating said first and second signals received from said third signals, and
a second intermediate frequency down-conversion stage having second and third mixers for mixing the outputs of said first and second filters, respectively, with the output of a local oscillator and
second means for selectively switching said first means from said first mode to said second mode.

* * * * *